P. B. CRANE.
TILLING MACHINE.
APPLICATION FILED FEB. 15, 1912.

1,162,456.

Patented Nov. 30, 1915.
3 SHEETS—SHEET 2.

WITNESSES

INVENTOR
PETER B. CRANE
BY
ATTORNEYS

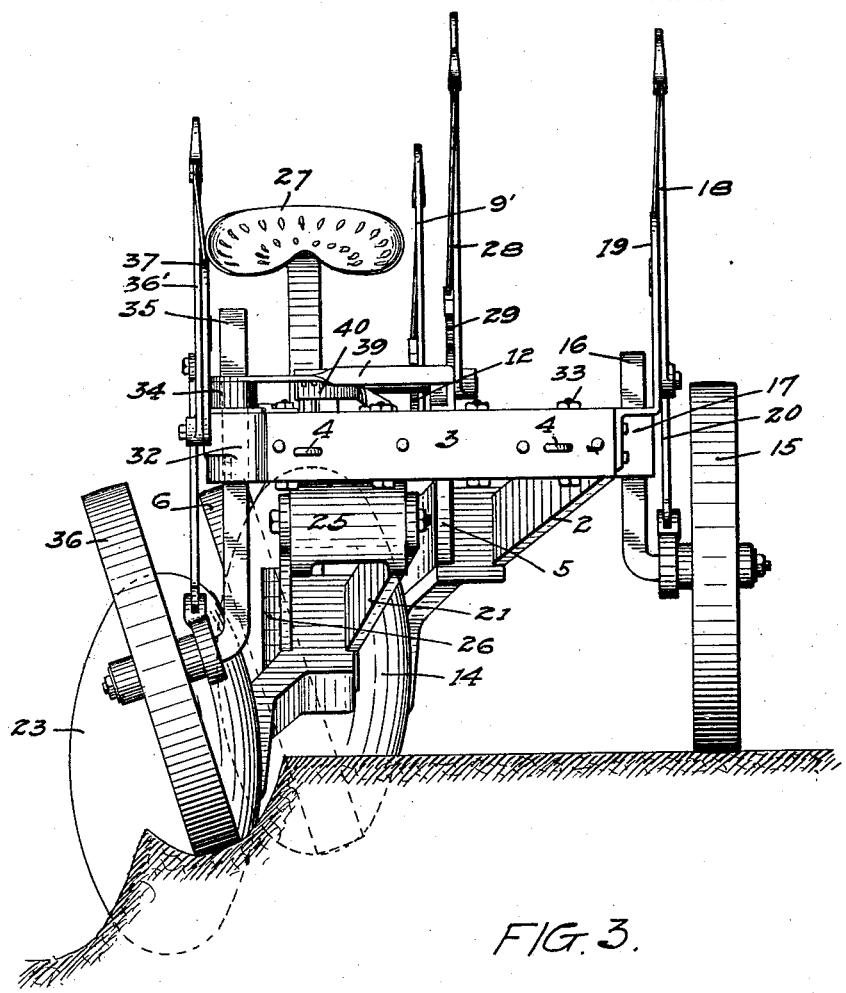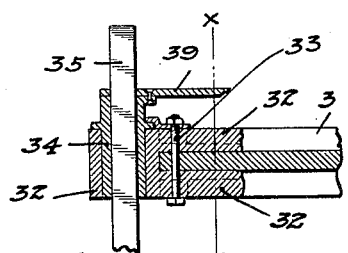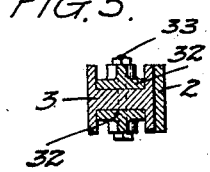

UNITED STATES PATENT OFFICE.

PETER B. CRANE, OF LONG LAKE, MINNESOTA, ASSIGNOR TO C. D. FOLLANSBEE, OF LONG LAKE, MINNESOTA.

TILLING-MACHINE.

1,162,456.

Specification of Letters Patent.

Patented Nov. 30, 1915.

Application filed February 15, 1912. Serial No. 677,736.

*To all whom it may concern:*

Be it known that I, PETER B. CRANE, of Long Lake, Hennepin county, Minnesota, have invented certain new and useful Improvements in Tilling-Machines, of which the following is a specification.

My invention relates to tilling machines and particularly those employed for deep soil tilling.
The object of my invention is to provide a machine of strong, compact construction and which may be adapted for either surface or deep soil tilling.

A further object is to provide a machine in which the engagement of one disk or plow with a stone or obstruction will not affect the other disk.

My invention consists generally in a machine provided with a rear caster wheel and forward wheels on opposite sides of the machine frame in staggered relation with one another.

Further the invention consists in independently supported disk plows arranged one in advance of the other.

Figure 1:
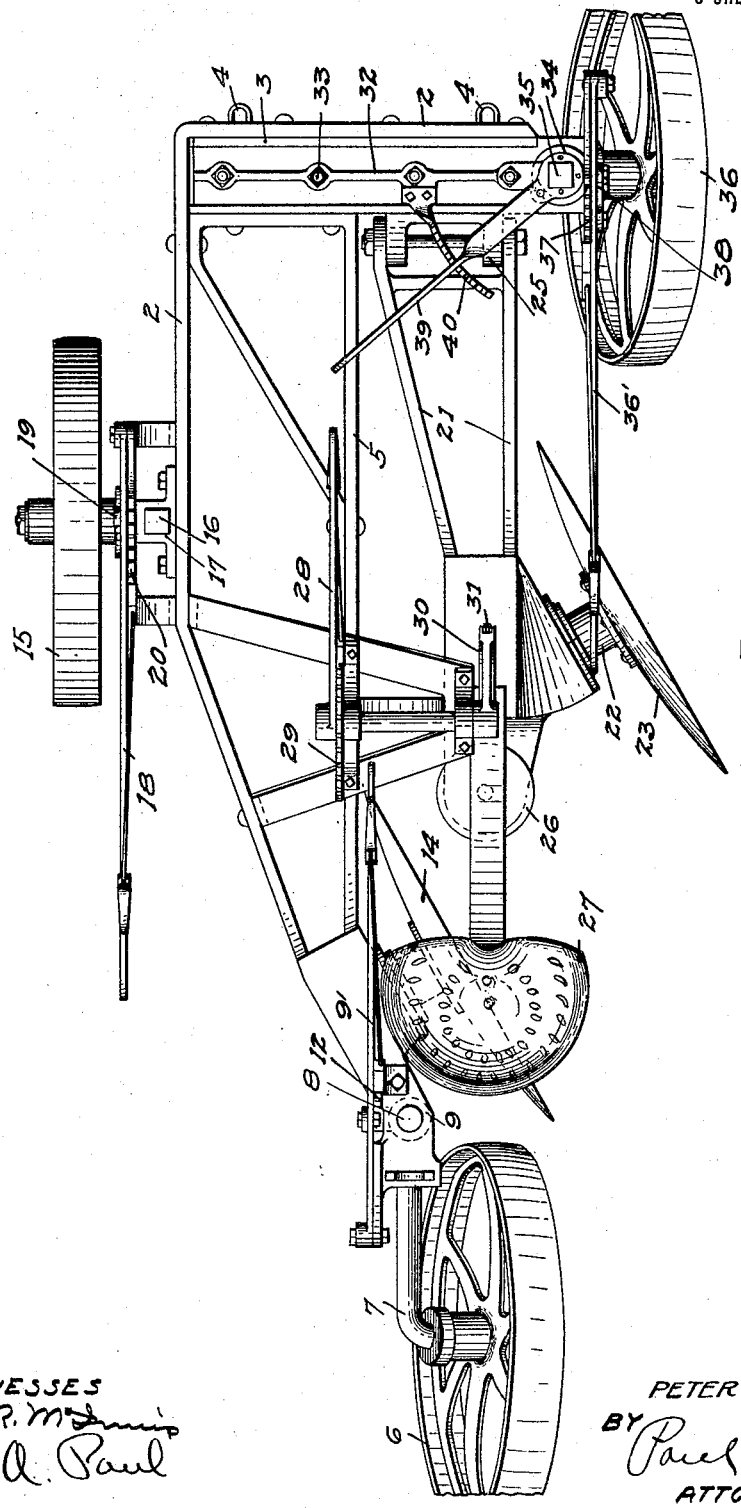
Figure 2:
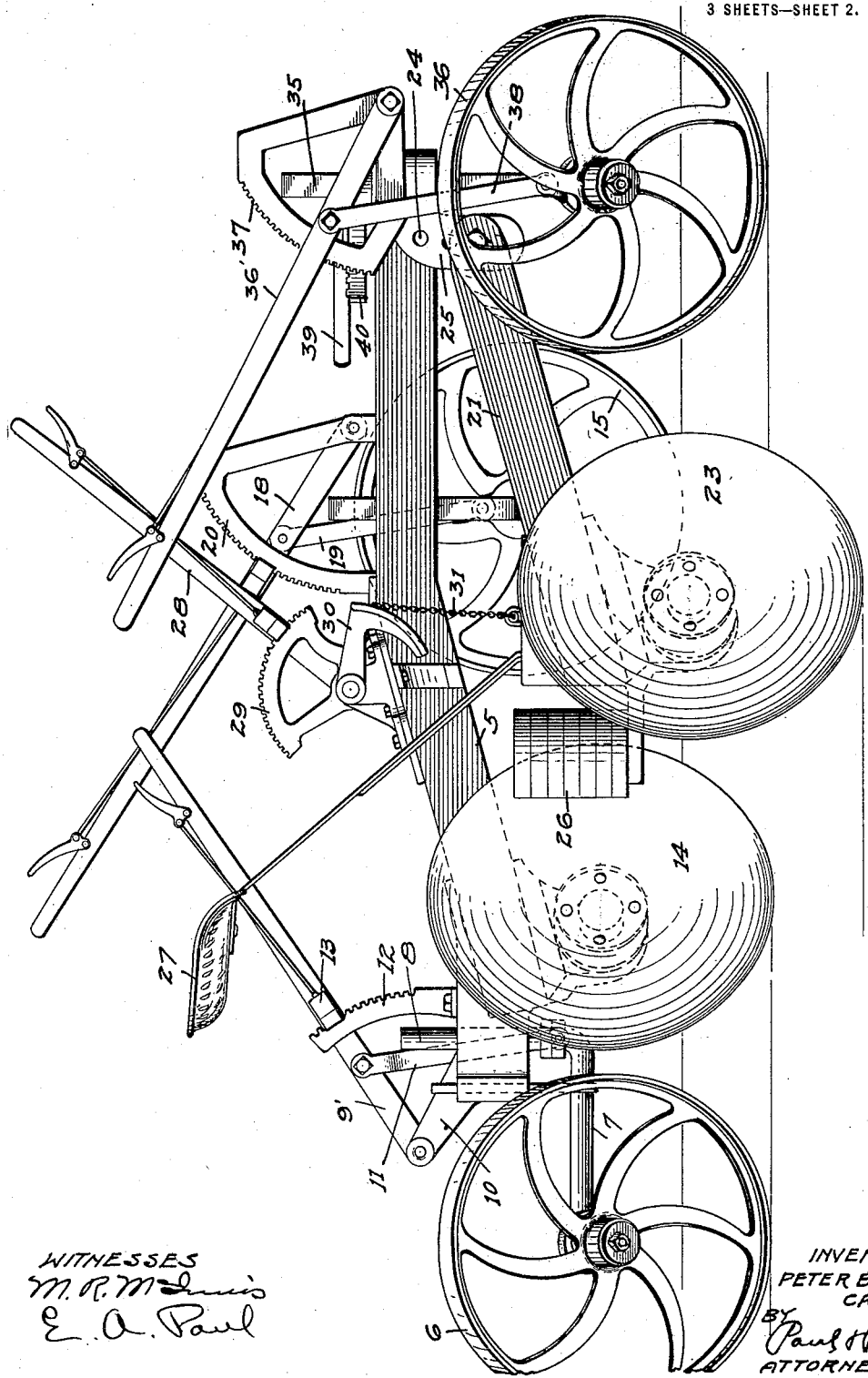

Further the invention consists in means for adjusting one of the supporting wheels laterally with respect to the machine frame to adapt the machine for surface plowing.
In the accompanying drawing forming part of this specification, Figure 1 is a plan view of a machine embodying my invention, Fig. 2 is a side elevation of the same, Fig. 3 is a front view illustrating the machine at work, Fig. 4 is a detail sectional view showing the adjustable connection of one of the wheels with the frame of the machine, Fig. 5 is a sectional view on the line *x—x* of Fig. 4.
In the drawing, 2 represents the frame of the machine, having a transverse I-beam 3 at its forward end to which the frame is secured, and draft connections 4. A draft bar or beam 5 is rigidly secured at its forward end to said I-beam and extends rearwardly therefrom, and it is supported at its rear end by a caster wheel 6. This wheel has an axle 7 provided with a vertical portion 8 fitting within a bearing 9 secured to the rear end of the bar 5 and adapted to rotate and slide vertically therein. The caster wheel is inclined to the vertical, as indicated in Fig. 1, and is adapted to run in the bottom of the furrow and bear against the side wall thereof and guide the rear portion of the machine.

For the purpose of raising or lowering the rear of the machine I provide a lever 9' pivoted on an arm 10 and having a link connection 11 with the axle 7. A quadrant 12 is mounted on the rear of the bar 5 and the lever 9' has the usual locking latch 13 for engaging the teeth of this quadrant and securing the axle at the desired elevation.

In front of the caster wheel a disk plow 14 is arranged, journaled in bearings secured to the rear portion of the bar 5. This plow is adapted to dig into the soil, its depth of cut being regulated by the adjustment of the caster wheel and the operator of the machine may increase or decrease this cut by the adjustment of the lever 9'.

Near the middle portion of the frame, preferably, I arrange one of the carrying wheels 15 having a vertical stud 16 slidable in a guide 17 secured on the frame and operated by means of a lever 18 having a link connection 19 with said stud and adapted to move over a quadrant 20. The adjustment of this lever operates to raise or lower the frame on that side of the machine.

Pivotally connected with the I-beam 3 and extending rearwardly therefrom is a second draft bar or beam 21, having a bearing 22 at its rear end for a second disk 23. This disk operates in front of the disk 14 and in staggered relation thereto and operates to make a second cut in the furrow and complete the deep soil tilling operation, as plainly shown in Fig. 3. The pivot of the drag bar 21 is vertically adjustable by means of the holes 24 provided in the bracket 25 to which the forward end of the drag bar is pivotally connected. To force this disk 23 into the soil, I prefer to provide a series of weights 26 carried by the rear end of the drag bar, the number of weights being increased or diminished at will according to the pressure desired on the disk. I also prefer to mount the driver's seat 27 on this drag bar so that the weight of the driver is utilized to force the deep soil disk into the ground.

To regulate the depth of cut I provide a lever 28 having the usual locking latch to engage a quadrant 29 and provided with an arm 30 having a flexible connection 31 with the drag bar 21. The adjustment of this lever 28 will determine the depth of cut of the disk 23. This construction allows the disks to work independently of one another. One disk may strike a stone or obstruction and rise to clear it without in any way affecting the other disk, and I am thus able to cut furrows more uniformly than usual in machines of this type.

A casting 32 is mounted to slide on the I-beam 3 and is secured thereto at intervals by bolts 33. This casting has a vertical socket in its outer end to receive a sleeve 34 in which a stud 35 is vertically slidable. The lower end of this stud is outwardly turned and has a bearing for the hub of the carrying wheel 36, which is also inclined to the vertical and adapted to bear on the bottom of the furrow and resist the lateral pull of the machine when the disks are at work. A lever 36' is pivoted on the machine frame near the stud 35 and has a locking latch to engage a quadrant 37 and a link connection 38 with the lower outwardly turned portion of said stud, the movement of said lever operating to raise or lower said stud and lift or depress the machine frame. The connection of the link 38 with the lower end of the stud 35 is near the hub of the wheel 36, as indicated in Fig. 3, and there is no obstruction on the vertical portion of the stud to prevent it from being drawn upwardly to a point where the lower end of said stud will be close to the frame of the machine, and the same is true of the adjustable connections for the wheel 15, as indicated plainly in Fig. 3. I thus provide for a wider range of adjustment than is usual in machines of this type.

Upon removing the bolts 33 from the I-beam, the casting 32 may be moved outwardly with the wheel 36 until the said wheel is at one side of the path of the plow disks and then by raising the disk 23 to the same level of the disk 14 the machine may be used for surface plowing, each disk cutting a furrow of the same depth.

I prefer also to mount a lever 39 on the upper end of the sleeve 34 and projecting inwardly over the machine frame to enable the operator to rotate the sleeve and the carrying wheel 36 to vary the direction of movement of said wheel with respect to the bottom of the furrow. The arm 39 is locked by means of a toothed bar 40 which is secured on the casting 32 and is slidable with it. Upon removing the bolts, the casting 32 may be adjusted outwardly to move the wheel 36 away from the machine frame so that it will not travel directly in front of the disk 23, and adapt the machine for surface plowing.

In the operation of the machine, I may load the forward disk by the weight of the driver or by the weights 26, or both, and force it into the soil to cut a deep furrow, the rear disk cutting a comparatively shallow furrow. Then on the next time around the land the forward disk will run in the furrow previously cut by the rear disk while the rear disk will be cutting another shallow furrow. In this way the forward disk cuts a deep furrow while the rear one is cutting a shallow furrow. If preferred, the forward disk and its beam may be raised to an inoperative position and the single shallow furrow cut the first time around the land, and then on the second time around the forward disk may run in the shallow furrow and increase the depth of cut. With this arrangement of the disks and the independent manner of mounting them, I am able to cut first a deep, then shallow, furrow, then deep, then shallow, and so on. In case either disk strikes an obstruction in the soil its upward movement to clear the obstruction will be independent entirely of the other disk.

I claim as my invention:

1. A tilling machine comprising a frame having forward carrying wheels, a disk plow journaled on said frame, means for regulating the depth of cut of said plow, a second disk plow located in front of and at one side of said first named plow and movable vertically, independently of said first named plow, said second named plow normally traveling in the furrow previously cut by said first named plow, removable weights supported by said second named plow and operating to force it into the soil to increase the depth of cut of said second named plow, and means for regulating the depth of cut of said second named plow.

2. A tilling machine comprising a frame, plows mounted therein, one in advance of the other and in staggered relation to one another, one plow traveling in the furrow previously cut by the other plow and freely movable vertically to clear obstructions and increase the depth of cut of said other plow.

3. A deep soil tilling machine comprising a frame, a beam pivoted thereon, disk plows mounted on said frame, and said beam, respectively, one disk being arranged in advance of and in staggered relation with respect to the other disk, said forward disk traveling in the furrow previously cut by said other disk and freely movable vertically with its beam to clear obstructions and increase the depth of cut of said other disk.

4. A tilling machine comprising a frame having carrying wheels, a plow disk mounted thereon, a beam pivoted on said frame, a disk mounted on said beam in front of and in staggered relation with respect to said first named disk and adapted to travel in the furrow previously cut by said first named disk, said beam and its disk having freedom of vertical movement to allow said beam disk to clear obstructions and to increase the depth of cut of said first named disk and means for weighting said beam and its disk.

5. A tilling machine comprising a frame having carrying wheels, a disk plow journaled on said frame, a beam pivotally connected with said frame, a second disk plow journaled on said beam in advance of said first named plow and at one side thereof, a driver's seat mounted on said beam, the weight of the driver operating to force said second plow into the soil below the cut of said first named plow.

6. A tilling machine comprising a frame, carrying wheels mounted on each side thereof, a vertically adjusted caster wheel supporting the rear of said frame, a disk plow carried by said frame near said wheel, said caster wheel operating to limit the depth of cut of said disk plow, a beam pivotally connected with said frame, a second disk plow carried by said beam in advance of said first named plow and at one side thereof, a weight carried by said beam and its plow being capable of moving vertically, independently of the other plow, said first named plow making the preliminary cut or furrow, said second named plow making a deeper cut in the bottom of the furrow made by said first named plow.

7. A tilling machine comprising a frame, having carrying wheels, a bar mounted on the forward portion of said frame transversely thereof and adjustable laterally with respect to said frame and of said carrying wheels being connected with said bar, a beam pivotally connected with said bar and extending rearwardly therefrom, a disk plow journaled on said beam, means for raising or lowering said pivoted beam, a second disk plow journaled on said frame, said plows being arranged in advance of one another and in staggered relation, the forward plow operating to deepen the furrow previously cut by the rear plow, the adjustment of said bar moving its carrying wheel outwardly and adapting the machine for surface plowing.

8. A tilling machine comprising a frame, a plow disk mounted thereon, a beam pivotally connected with said frame and free to oscillate vertically on its pivot, a disk mounted on said beam in front of and in staggered relation to said frame disk and having freedom of vertical movement with said beam and traveling in the furrow previously cut by said frame disk and adapted to deepen the cut of said furrow, and means for limiting the downward movement of said beam and disk.

9. A tilling machine comprising a frame and carrying wheels therefor, a vertically adjustable caster wheel at the rear of said frame, a disk plow mounted on said frame, said caster wheel operating to regulate the depth of cut of said plow, a beam pivotally connected to said frame, a second disk plow carried by said beam, said second disk plow being movable vertically, independently of the other plow, said second named plow being mounted in staggered relation to said first named plow and operating on the second time across the field to make a deeper cut in the furrow made by said first named plow on the first time across.

10. A tilling machine comprising a frame, disk plows mounted therein, one in advance of another and offset from one another, the forward plow traveling in the furrow previously cut by the rear plow, said forward plow being movable vertically, independently of the rear plow, and having means for supporting the driver's seat.

11. A tilling machine comprising a frame having carrying wheels, a disk plow mounted on said frame and movable vertically therewith, a beam pivoted on said frame, a disk plow mounted on said beam and traveling during a trip across the field in the furrow cut by said first named plow on a previous trip across the field, and freely movable vertically with said beam to increase the depth of cut of said first named plow.

12. A tilling machine comprising a frame having forward carrying wheels, a rear caster wheel and means for adjusting said caster wheel vertically, a plow mounted on said frame in front of and near said caster wheel, the adjustment of said caster wheel regulating the depth of cut of said plow, a second plow arranged in front of said first named plow and at one side thereof and normally traveling in the furrow previously cut by said first named plow, said second named plow being freely movable vertically, independently of said first named plow while the machine is at work, and means for regulating the depth of cut of said second named plow.

13. A tilling machine comprising a frame, a disk plow mounted thereon, a beam pivotally connected with said frame, a second disk plow mounted on said beam in front of and in staggered relation with respect to said first named plow and traveling in the furrow previously cut by said first named plow, weights removably mounted on said beam for forcing said beam disk into the soil to increase the cut of said first named plow, and means for limiting the depth of cut of said second named plow.

14. A tilling machine comprising a frame, a forward and a rear disk plow offset with respect to one another, one plow being secured to said frame and movable vertically only with the rise and fall of said frame, the other plow being freely movable vertically, independently, and traveling in the furrow previously cut by said first named plow, and removable weights carried by said second named plow and operating to force it into the soil to increase the depth of cut of said first named plow.

15. A tilling machine comprising a frame having forward and rear carrying wheels, a plow mounted on said frame, one of the forward carrying wheels traveling in the furrow on the second time around the field that was cut by said plow on the first time around, and a second plow mounted in the rear of the forward carrying wheels and arranged to run in the same furrow and increase the depth of cut thereof, said first named plow cutting a new furrow during the movement of said second named plow in the preceding furrow.

16. A tilling machine comprising a frame having carrying wheels, a plow mounted in said frame, one of said carrying wheels traveling in the furrow previously cut by said plow, and a second plow arranged to follow said carrying wheel and increase the depth of cut of the furrow, said second plow being freely movable vertically and having means for regulating its depth of cut.

17. A tilling machine comprising a frame having carrying wheels, a disk plow mounted in said frame and movable vertically therewith, one of said carrying wheels traveling in the furrow previously cut by said plow, a second disk plow mounted in the rear of said carrying wheel and also traveling in said furrow and operating to increase the depth of cut thereof, said second named plow moving freely, vertically, independently of said first named plow, and means for forcing said second named plow into the soil and regulating the depth of cut thereof.

In witness whereof, I have hereunto set my hand this 9" day of February, 1912.

PETER B. CRANE.

Witnesses:
GENEVIEVE E. SORENSEN,
EDWARD A. PAUL.

Copies of this patent may be obtained for five cents each, by addressing the "Commissioner of Patents, Washington, D. C."